Patented Apr. 6, 1937

2,076,400

UNITED STATES PATENT OFFICE 2,076,400

LACTEAL DERIVATIVE

Forest H. Clickner, Chicago, Ill., assignor to Kraft-Phenix Cheese Corporation, Chicago, Ill., a corporation of Delaware No Drawing. Application April 16, 1934, Serial No. 720,808

3 Claims. (Cl. 204—9)

My invention relates to lacteal derivatives and has to do more particularly with a new composition of matter which may be readily obtained from whey, and which composition is of great nutritive and therapeutic value. It is especially valuable in connection with calcium therapy.

I have found that when whey having an acidity within a range to be described below is electrolyzed, there is a precipitation of certain solids which may be filtered out and which, especially when washed, consist essentially of highly assimilable calcium and phosphorus salts. While the precise chemical nature of these salts has not been determined, owing to great difficulties involved in the chemical identification of the material, said product obtained according to my invention is found to have an efficiency in calcium therapy superior to any material with which I am familiar. Furthermore, said product is highly palatable and thus may be ingested either alone in the form of tablets, etc., or may be mixed with foodstuffs, such as cheese, etc.

This application is a continuation in part of my co-pending application, Serial No. 692,314, filed October 5, 1933, wherein I have described the electrolysis of whey, in order to adjust the pH value thereof. The present invention may be considered an incident of said electrolysis.

Method

I start with whey of an acid nature, the pH value thereof being approximately 4.3, the iso-electric point of casein. The acid present in the whey may be lactic acid formed by natural fermentation or it may be a foreign acid, such as, say, hydrochloric acid introduced for the purpose of separating the casein from milk, or for other purposes, as set forth in my said co-pending application Serial No. 692,314. If the acidity of the whey is not originally at the desired pH value, it may be adjusted to about 4.3 by obvious means.

The whey of such pH value is run through an electrolytic cell, preferably in a continuous stream. Said cell may be of any well-known or other suitable type, but I prefer a cell having an outer cylindrical shell of iron, serving as a cathode, said shell being connected in a suitable electrical circuit and having an inlet at the bottom into which the whey is introduced. Whey is forced upwardly through the cell and overflows at the top, whence it drops, in a broken stream, into a funnel-like or other suitable receptacle from which it is withdrawn from time to time or preferably continuously. Within said metallic receptacle, and preferably concentric therewith, is a cylindrical porous cup formed of aluminum oxide ($Al_2O_3$) or ceramic ware or other suitable semi-permeable material, said cup being closed at the bottom and open at the top. Disposed centrally within said cup is a carbon-anode, which may be connected to any convenient source of current and in the circuit with said cathode.

The porous cup is kept filled with sodium chloride solution, the concentration of which is maintained at such a point as will be sufficient to modify the pH value of the whey passing through the cell to such an extent that the whey leaving the cell will have a pH value within the approximate range of 5.5 to 6. I have found the optimum pH value to be about 5.7, which yields a product high in vitamin G content. However, if the vitamin G value is not of particular importance, the pH adjustment need not be so restricted.

The preferred concentration of salt which is desired to be maintained within the porous cup is approximately 15 per cent NaCl.

The electrolysis of the whey flowing through the cell results not only in modifying the pH value thereof, as just described, but also in precipitating substantially all of the calcium present in the whey. This is the substance which is especially desirable in my final product. In addition to the calcium, there is also precipitated approximately 20 per cent of the phosphorus present in the whey. As stated above, I am not able to state in precisely what chemical form these substances will be precipitated, although it can be said that they are probably in the form of inorganic salts.

The whey withdrawn from the cell is preferably conducted directly to an Oliver type of filter or similar apparatus capable of filtering out the material precipitated as a result of the electrolytic operation. The filter separates said precipitate from the aqueous fluid and the latter may be conducted to suitable apparatus to be converted to whey powder, in accordance with any well-known process; for example, the process described in Simmons Patent No. 1,763,633 or Eldredge Patent No. 1,923,427. In order that the concentration of calcium and phosphorus salts may be as high as possible in the ultimate product, the precipitate is preferably washed with water to remove the lactose therefrom, which is usually present in the proportion of about 25 per cent by weight of the original precipitate, and said wash liquid containing the lactose may be added to the filtrate to be dried, as described above.

The valuable residue may be removed from the filter and dried in any well-known manner, preferably at low temperatures in order to avoid deterioration of the protein present, and the dried product is now ready for consumption. If desired, it may be compressed in the form of pellets or tablets or it may be added as a powder to various articles of food, such as cream cheese, etc. It will be found that the improved product blends well in flavor with most dairy products, and has a pleasing taste.

A typical example of my improved product has approximately the following composition:

|  | Per cent |
|---|---|
| Calcium (Ca) | 18.1 |
| Phosphorus ($P_2$) | 6.3 |
| Protein (as lactalbumin) | 20 |

An important application of my invention is in the treatment of various diseases in which calcium metabolism is of great importance, such as migraine, allergic diseases, such as asthma, thyroid disorders, and various other calcium-deficiency diseases. In the treatment of such diseases it has been customary heretofore to administer calcium gluconate. However, a disadvantage of this material is that it is not equally advantageous for all persons; the therapeutic efficiency apparently varies with different individuals. However, with my improved product it is found that the calcium is in extremely highly assimilable form and may be used with very great and substantially equal efficiency with all individuals. Furthermore, my improved product contains at least twice as much calcium as calcium gluconate and has at least twice the therapeutic efficiency.

It is believed that the calcium in my improved compound is in the same chemical form as in natural milk. However, five grams of my improved dry powder contains a quantity of calcium equal to that present in one quart of milk and, furthermore, is much more highly assimilable, so that the calcium efficiency of five grams of my improved product is considerably greater than that of a quart of milk. This may be explained by pointing out that the assimilability of the calcium in milk is interfered with by the other substances present in the milk. However, in my improved product the calcium may be substantially all metabolized, so that it will have the utmost effect when administered for calcium deficiency disorders. These results have been proven experimentally by blood tests taken before and after oral ingestion of my improved compound, showing that the admission of the calcium present in my product into the blood stream is extremely rapid.

It is also obvious that the phosphorus content of my improved product, which is in similar form to that of milk, is also of considerable value. Thus, recent researches have revealed that the phosphorus present in milk is of considerable therapeutic value in the human body in maintaining the health and sexual potency of an individual, and my improved product is of value in this connection.

Various modifications coming within the spirit of my invention will doubtless suggest themselves to those skilled in the art and, hence, I do not wish to be limited to the specific embodiments described above but intend that the scope of my invention shall be determined from the appended claims, which are to be construed as broadly as the state of the art will permit.

I claim as my invention:

1. A continuous method of precipitating a therapeutic composition containing a substantial proportion of assimilable calcium and phosphorus salts which comprises passing an acid whey solution having a pH value of about 4.3 through a cathode compartment of an electrolytic cell having the anode thereof bathed in a salt solution of a highly ionizable alkali metal and separated from said cathode compartment by a semipermeable material so that the pH value of the whey solution on leaving said compartment is about 5.7.

2. A continuous method of precipitating a therapeutic salt composition containing about 18 per cent calcium and about 6 per cent phosphorus which comprises passing an acid whey solution having a pH value of about 4.3 through a cathode compartment of an electrolytic cell having the anode bathed in an aqueous solution of sodium chloride and separated from said cathode compartment by a porous ceramic cup, the rate of flow of said whey solution being so regulated that the pH value thereof on leaving the cell is about 5.7.

3. A continuous method of precipitating a therapeutic composition containing a substantial proportion of assimilable calcium and phosphorus salts which comprises passing an acid whey solution having a pH value of about 4.3 through a cathode compartment of an electrolytic cell having the anode thereof bathed in a sodium chloride solution and separated from said cathode compartment by a porous aluminum oxide receptacle the rate of flow of said whey solution being so regulated that the pH value thereof on leaving the cell is about 5.7.

FOREST H. CLICKNER.